United States Patent
Kim et al.

(10) Patent No.: US 9,701,763 B2
(45) Date of Patent: Jul. 11, 2017

(54) METHOD FOR PREPARING SUPER ABSORBENT POLYMER

(71) Applicant: LG Chem, Ltd., Seoul (KR)

(72) Inventors: Gi Cheul Kim, Daejeon (KR); Sang Gi Lee, Daejeon (KR); Kyu Pal Kim, Daejeon (KR); Sung Soo Park, Daejeon (KR)

(73) Assignee: LG Chem, Ltd. (KR)

( * ) Notice: Subject to any disclaimer, the term of this patent is extended or adjusted under 35 U.S.C. 154(b) by 24 days.

(21) Appl. No.: 14/917,235

(22) PCT Filed: Sep. 29, 2014

(86) PCT No.: PCT/KR2014/009115
§ 371 (c)(1),
(2) Date: Mar. 7, 2016

(87) PCT Pub. No.: WO2015/046992
PCT Pub. Date: Apr. 2, 2015

(65) Prior Publication Data
US 2016/0208022 A1    Jul. 21, 2016

(30) Foreign Application Priority Data
Sep. 30, 2013    (KR) .................. 10-2013-0116757

(51) Int. Cl.
| | |
|---|---|
| C08F 2/46 | (2006.01) |
| C08F 2/50 | (2006.01) |
| C08G 61/04 | (2006.01) |
| C08F 2/10 | (2006.01) |
| C08J 3/075 | (2006.01) |
| C08F 2/48 | (2006.01) |
| C08F 6/00 | (2006.01) |
| C08L 101/14 | (2006.01) |
| C08F 220/18 | (2006.01) |

(52) U.S. Cl.
CPC ................ *C08F 2/50* (2013.01); *C08F 2/10* (2013.01); *C08F 2/48* (2013.01); *C08F 6/008* (2013.01); *C08F 220/18* (2013.01); *C08J 3/075* (2013.01); *C08L 101/14* (2013.01)

(58) Field of Classification Search
CPC .. C08F 2/50; C08F 20/10; C08F 6/008; C08F 2/48; C08F 2/10; C08J 3/075; C08L 101/14
USPC ...... 522/13, 12, 7, 6, 189, 184, 1, 71; 520/1
See application file for complete search history.

(56) References Cited

U.S. PATENT DOCUMENTS

| | | |
|---|---|---|
| 2002/0040095 A1 | 4/2002 | Dairoku et al. |
| 2006/0089611 A1* | 4/2006 | Herfert .................. A61L 15/42 604/367 |
| 2008/0081848 A1 | 4/2008 | Shih et al. |
| 2011/0301027 A1 | 12/2011 | Bitis et al. |
| 2014/0051813 A1* | 2/2014 | Won .................. C08J 3/245 525/384 |
| 2014/0058048 A1 | 2/2014 | Won et al. |
| 2016/0053037 A1* | 2/2016 | Lee .................. A61L 15/24 525/329.7 |
| 2016/0175813 A1* | 6/2016 | Ryu .................. C08J 3/075 502/402 |
| 2016/0184799 A1* | 6/2016 | Lee .................. C08F 20/10 525/296 |
| 2016/0207026 A1* | 7/2016 | Lee .................. C08J 3/245 |
| 2016/0214082 A1* | 7/2016 | Lee .................. B01J 20/28026 |

FOREIGN PATENT DOCUMENTS

| | | |
|---|---|---|
| CN | 1908020 A | 2/2007 |
| CN | 101942065 A | 1/2011 |
| EP | 1178059 A2 | 2/2002 |
| EP | 3056521 A1 | 8/2016 |
| JP | 2003-221783 A | 8/2003 |
| KR | 20120047034 A | 5/2012 |
| KR | 20120049004 A | 5/2012 |
| KR | 20120054836 A | 5/2012 |
| KR | 2012-0059169 A | 6/2012 |
| WO | 2012-074254 | * 6/2012 |

OTHER PUBLICATIONS

International Search Report for Application No. PCT/KR2014/009115 dated Dec. 26, 2014.
Odian, George, "Principles of Polymerization", Second Edition, A Wiley-Interscience Publication, John Wiley & Sons, 1981, p. 203.
PCT Third Party Observation for Application PCT/KR014/009115, date of Sumission Jan. 26, 2016.
Extended Search Report from European Application No. 14848361.3, dated Oct. 7, 2016.

* cited by examiner

*Primary Examiner* — Jessica E Whiteley
(74) *Attorney, Agent, or Firm* — Lerner, David, Littenberg, Krumholz & Mentlik, LLP

(57) ABSTRACT

This disclosure relates to a method for preparing super absorbent polymer. The method for preparing super absorbent polymer according to the present invention comprises the steps of performing photopolymerization of a monomer composition comprising water soluble ethylene unsaturated monomers, a thermal polymerization initiator and a photopolymerization initiator at a temperature of 30 to 55° C.; performing a thermal polymerization and a photopolymerization at a temperature of 55 to 120° C. to form a hydrogel polymer; and drying the hydrogel polymer. According to the present invention, by comprising two polymerization steps including performing photopolymerization at low temperature and then performing thermal polymerization or photopolymerization at high temperature, super absorbent polymer having improved physical properties may be obtained.

10 Claims, No Drawings

METHOD FOR PREPARING SUPER ABSORBENT POLYMER

CROSS-REFERENCE TO RELATED APPLICATION

This application is a national phase entry under 35 U.S.C. §371 of International Application No. PCT/KR2014/009115, filed Sep. 29, 2014, which claims priority to Korean Patent Application No. 10-2013-0116757, filed Sep. 30, 2013, the disclosures of which are incorporated herein by reference.

BACKGROUND OF THE INVENTION (a) Field of the Invention

The present invention relates to a method for preparing super absorbent polymer. More particularly, the present invention relates to a method for preparing super absorbent polymer comprising two polymerization steps.

(b) Description of the Related Art

Super Absorbent Polymer (SAP) is synthetic polymer material that can absorb moisture of about 500 to 1000 times of the self weight, and is differently named as SAM (Super Absorbency Material), AGM (Absorbent Gel Material) and the like according to development companies. The super absorbent polymer began to be commercialized as sanitary goods, and currently, it is widely used as a soil water retention agent for horticulture, water stop material for civil engineering and construction, a sheet for raising seeding, a freshness maintaining agent in the field of food distribution, and fomentation material and the like, in addition to hygienic goods such as a disposable diaper for children.

The super absorbent polymer can be generally prepared in a powder type product by polymerizing monomers for polymer and drying and pulverizing it.

In the process of preparing super absorbent polymer, the step of polymerizing monomers is an important step for determining the physical properties of polymer. As the polymerization method, reverse phase suspension polymerization, thermal polymerization and photopolymerization and the like are known. Among them, as the photopolymerization method, a method of putting a monomer composition for polymer on a belt and irradiating from the top to polymerize the monomer composition is known.

However, according to the above polymerization method, the amount of irradiation may not be uniform according to the depth of the monomer composition, and thus, polymerization degree may become non-uniform according to the depth. For example, in case a monomer composition of a predetermined thickness is put on a belt, on the upper part of the monomer composition located closely to light source, polymerization progresses relatively excessively due to the large amount of light irradiation, while on the lower part of the monomer composition located far from the light source, the amount of light irradiation is insufficient and thus polymerization may not be completely conducted and non-polymerized components may be remained. In this case, the physical properties of super absorbent polymer may be degraded. To overcome this, quantity of light or light irradiation time may be varied according to the location of the monomer composition solution, which makes the process complicated and increases process time, thus lowering productivity.

SUMMARY OF THE INVENTION

In order to overcome the problems of the prior art, it is an object of the present invention to provide a method for preparing super absorbent polymer having improved physical properties by comprising two polymerization steps.

In order to achieve the object, the present invention provides a method for preparing super absorbent polymer comprising the steps of: performing photopolymerization of a monomer composition comprising water soluble ethylene unsaturated monomers, a thermal polymerization initiator and a photopolymerization initiator at a temperature of 30 to 55° C.; performing a thermal polymerization and a photopolymerization at a temperature of 55 to 120° C. to form a hydrogel polymer; and drying the hydrogel polymer.

According to the method for preparing super absorbent polymer of the present invention, super absorbent polymer that has a high absorption capacity and yet has a low water soluble component content can be prepared.

DETAILED DESCRIPTION OF THE EMBODIMENTS

Although the present invention may have various forms and various modifications may be made thereto, specific embodiments will be exemplified and explained in detail hereinafter. However, it should be understood that the present invention is not limited to the specific disclosure, and includes all modifications, equivalents or substitutes within the scope of the idea and technology of the present invention.

Hereinafter, the method for preparing super absorbent polymer according to one embodiment of the invention will be explained in detail.

The method for preparing super absorbent polymer comprises the steps of: performing photopolymerization of a monomer composition comprising water soluble ethylene unsaturated monomers, a thermal polymerization initiator and a photopolymerization initiator at a temperature of 30 to 55° C.; performing a thermal polymerization and a photopolymerization at a temperature of 55 to 120° C. to form a hydrogel polymer; and drying the hydrogel polymer.

In the method for preparing super absorbent polymer, the monomer composition, which is raw material of the super absorbent polymer, comprises water soluble ethylene unsaturated monomers and polymerization initiators.

As the water soluble ethylene unsaturated monomers, any monomers commonly used for the preparation of super absorbent polymer may be used without specific limitations. Specifically, at least one monomer selected from the group consisting of anionic monomers and salts thereof, non-ionic hydrophilic group-containing monomers, and amino group-containing unsaturated monomers and quaternarized compounds thereof may be used.

In detail, the anionic monomers may include (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid or 2-(meth)acrylamide-2-methyl propane sulfonic acid; the non-ionic hydrophilic group-containing monomers may include (meth)acrylamide, N-substituted(meth)acrylate, 2-hydroxyethyl(meth)acrylate, 2-hydroxypropyl(meth)acrylate, methoxypolyethyleneglycol(meth)acrylate or polyethyleneglycol(meth)acrylate; and the amino group-containing unsaturated monomers may include (N,N)-dimethylaminoethyl(meth)acrylate or (N,N)-dimethylaminopropyl(meth)acrylamide.

More specifically, acrylic acid or salts thereof, for example, acrylic acid or an alkali metal salt thereof such as a sodium salt thereof and the like may be used, which enables preparation of super absorbent polymer having more excellent physical properties. In case the alkali metal salt of acrylic acid is used as the monomer, acrylic acid may be neutralized with a basic compound such as caustic soda (NaOH) before use.

The concentration of the water soluble ethylene unsaturated monomers may be about 20 to about 60 wt %, preferably about 40 to about 50 wt %, based on the monomer composition comprising the raw material of the super absorbent polymer and a solvent, and it may be appropriately controlled considering the polymerization time and reaction conditions, and the like. However, if the concentration of the monomer is too low, yield of super absorbent polymer may be decreased and there may be a problem in terms of economical feasibility, and if the concentration is too high, a part of the monomers may be precipitated or pulverization efficiency may be low when the polymerized hydrogel polymer is pulverized, thus causing process problems, and the physical properties of super absorbent polymer may be degraded.

Meanwhile, in the step of polymerizing a monomer composition to form a hydrogel polymer, the polymerization method is largely classified into thermal polymerization and photopolymerization according to polymerization energy source.

In case thermal polymerization is progressed, it may be commonly progressed in a reactor such as a kneader equipped with an agitation shaft, and in case photopolymerization is progressed, it may be progressed in a reactor equipped with a movable conveyor belt, and thus, the reactor may be varied according to the polymerization method.

For example, when hydrogel polymer is obtained by supplying hot wind to a reactor such as a kneader equipped with an agitation shaft or heating the reactor, the hydrogel polymer discharged to the outlet of the reactor may have a shape of several centimeters to several millimeters according to the shape of the agitation shaft of the reactor. Specifically, the size of the obtained hydrogel polymer may be varied according to the concentration of the introduced monomer composition and introduction speed, and the like, and commonly, hydrogel polymer having weight average particle diameter of 2 to 50 mm may be obtained.

And, in case photopolymerization is progressed in a reactor equipped with a movable conveyor belt, the obtained hydrogel polymer may commonly have a shape of a sheet having a width of the belt. Wherein, the thickness of the polymer sheet may be varied according to the concentration of the introduced monomer composition and the introduction speed, but it is preferable to supply a monomer composition so as to obtain a sheet shaped polymer having a thickness of about 0.5 to about 5 cm. If the monomer composition is supplied such that the thickness of the sheet shaped polymer may be too thin, production efficiency may be low, and if the thickness of the sheet shaped polymer is greater than 5 cm, the polymerization reaction may not be uniformly conducted over the whole thickness, due to the too thick thickness.

Meanwhile, according to one embodiment of the invention, both thermal polymerization and photopolymerizaiton are conducted in a reactor equipped with a conveyor belt.

The polymerization reaction for polymerizing ethylene unsaturated monomers is an exothermic reaction. Thus, even if the reaction begins at low temperature of the monomer composition, as the reaction progresses, the temperature of the monomer composition gradually increases to a high temperature state. Thus, in case thermal polymerization is progressed, in order to initiate a reaction, a thermal initiator for low temperature that can initiate a reaction even at low temperature, and a thermal initiator for high temperature that initiates a reaction at a high temperature state after the middle stage of the reaction are used in combination. However, in case thermal polymerization is progressed with two or more kinds of thermal initiators only, as the reaction progresses, it may be difficult to control the temperature and the decomposition speed of the thermal initiators in the monomer composition may be varied, and thus, the molecular weight distribution of the produced polymer may be non-uniform and wide, which may cause degradation of the physical properties of the final super absorbent polymer.

And, even in case photopolymerization is progressed, heat is generated to some degree as the polymerization reaction, which is also an exothermic reaction, is progressed, and thus, a method of progressing the polymerization with additionally using thermal initiator is known. However, according to the method, since thermal polymerization simultaneously occurs from the beginning at a common photopolymerization initiation temperature of 55° C., the efficiency of the initiation of the photopolymerization may be decreased and it may be difficult to produce high molecular weight polymer.

Thus, in the preparation method of super absorbent polymer of the present invention, first, photopolymerization of the monomer composition is progressed at a temperature of about 30 to about 55° C. As such, since photopolymerization is initiated at low temperature, the action of the thermal initiator is excluded and the photopolymerization reaction may be progressed at a constant speed. If the temperature is too lower than the above range, non-polymerized products may be generated, and if it is too high exceeding 55° C., thermal polymerization may occur, which may not be preferable.

The light source that can be used in the photopolymerization step is not specifically limited, and UV light source known to cause photopolymerization may be used without specific limitations. For example, light with a wavelength of about 200 to about 400 nm may be used, and UV light source such as Xe lamp, mercury lamp, or metal halide lamp and the like may be used. And, the photopolymerization step may be conducted for about 5 seconds to about 10 minutes at the intensity of about 0.1 mw/cm$^2$ to about 1 kw/cm$^2$. If the intensity of the light applied for the photopolymerization and the time are too small or short, the polymerization reaction may not sufficiently occur, and if the intensity and the time are too large or long, the quality of super absorbent polymer may be degraded.

As the photopolymerization is progressed, the temperature of the monomer composition increases, and when the temperature of the monomer composition reaches about 55° C., thermal polymerization is additionally progressed by the action of the thermal initiator. The temperature of the second step during which the thermal polymerization and photopolymerization are progressed may be about 55 to about 120° C., or about 60 to about 120° C. However, at this temperature, thermal polymerization may more predominantly occur than photopolymerization.

Additional heat source may be used so that the monomer composition may reach a suitable temperature. The heat source may be used without specific limitations, and for example, hot wind, microwave irradiation, near infrared ray irradiation and the like may be used.

As explained above, since both thermal polymerization and photopolymerization are conducted in the method of preparing super absorbent polymer, polymerization initiators used during polymerization includes both a thermal polymerization initiator and a photopolymerization initiator.

As the photopolymerization initiator, compounds that can form a radical by light such as UV may be used without specific limitations on the construction.

As the photopolymerization initiator, for example, at least one selected from the group consisting of benzoin ether, dialkyl acetophenone, hydroxyl alkylketone, phenyl glyoxylate, benzyl dimethyl ketal, acyl phosphine and α-aminoketone may be used. Meanwhile, specific example of the acyl phosphine may include commercially available lucirin TPO, namely, 2,4,6-trimethyl-benzoyl-trimethyl phosphine oxide. More various photoinitiators are well stated in "UV Coatings: Basics, Recent Developments and New Application (Elsevier 2007)", Reinhold Schwalm, p 115, and are not limited to the above examples.

The photopolymerization initiator may be included in the concentration of about 0.002 to about 0.2 wt % based on the monomer composition. If the concentration of the photopolymerization initiator is too low, polymerization speed may become slow, and if the concentration of the photopolymerization initiator is too high, the molecular weight of high absorbent polymer may become small and the physical properties may become non-uniform.

And, as the thermal polymerization initiator, at least one selected from the group consisting of persulfate initiators, azo initiators, hydrogen peroxide and ascorbic acid may be used. Specific examples of the persulfate initiators may include sodium persulfate ($Na_2S_2O_8$), potassium persulfate ($K_2S_2O_8$), ammonium persulfate (($NH_4)_2S_2O_8$) and the like, and specific examples of the azo initiators may include 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid) and the like. More various thermal polymerization initiator are well stated in 'Principle of Polymerization (Wiley, 1981)', Odian, p 203, and are not limited to the above examples. Preferably, persulfate initiators such as sodium persulfate ($Na_2S_2O_8$), potassium persulfate ($K_2S_2O_8$), ammonium persulfate (($NH_4)_2S_2O_8$) and the like may be used.

The thermal polymerization may be included in the concentration of about 0.01 to about 0.5 wt % based on the monomer composition. If the concentration of the thermal polymerization initiator is too low, additional thermal polymerization may hardly occur and the effects resulting from the addition of the thermal polymerization initiator may be insignificant, and if the concentration of the thermal polymerization initiator is too high, the molecular weight of high super absorbent polymer may be small and the physical properties may become non-uniform.

According to one embodiment of the invention, the monomer composition may further comprise an internal crosslinker as the raw material of super absorbent polymer. As the internal crosslinker, a crosslinker that has at least one functional group capable of reacting with the water soluble substituent of the water soluble ethylene unsaturated monomer and yet has at least one ethylene unsaturated group; or a crosslinker that has at least two functional groups capable of reacting with the water soluble substituent of the monomer and/or the water soluble substituent formed by the hydrolysis of the monomers may be used.

Specific examples of the internal crosslinker may include C8-C12 bisacrylamide, bismethacrylamide, poly(meth)acrylate of C2-C10 polyol or poly(meth)allylether of C2-C10 and the like, and more specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triarylcyanurate, triallylisocyanate, polyethyleneglycol, diethyleneglycol and propyleneglycol may be used.

The internal crosslinker may be included at the concentration of about 0.01 to about 0.5 wt % based on the monomer composition, and it may crosslink the polymerized polymer.

In the preparation method of the present invention, the monomer composition of super absorbent polymer may further comprise additives such as a thickener, a plasticizer, a preservation stabilizer, an antioxidant and the like, as necessary.

The above explained raw materials of ethylene unsaturated monomers, photopolymerization initiator, thermal polymerization initiator, internal crosslinker and additives may be prepared in the form of a monomer composition solution dissolved in a solvent.

Wherein, the solvent that can be used is not specifically limited as long as it can dissolve the above explained components, and for example, at least one selected from the group consisting of ethanol, ethyleneglycol, diethyleneglycol, triethyleneglycol, 1,4-butanediol, propyleneglycol, ethyleneglycolmonobutylether, propyleneglycolmonomethylether, propyleneglycolmonomethyletheracetate, methylethylketone, acetone, methylamylketone, cyclohexanone, cyclopentanone, diethyleneglycolmonomethylether, diethyleneglycolethylether, toluene, xylene, butyrolactone, carbitol, methylcellosolveacetate and N,N-dimethylacetamide and the like may be used in combination.

The solvent may be included in the remaining contents other than the above explained components, based on the total content of the monomer composition.

The hydrogel polymer obtained by the method may commonly have a moisture content of about 40 to about 80 wt %. Meanwhile, as used herein, the term "moisture content" refers to the content of moisture occupied based on total weight of the hydrogel polymer, and is a value calculated by subtracting the weight of dried polymer from the weight of hydrogel polymer. Specifically, it is defined by the value calculated by measuring weight loss according to moisture evaporation during polymerization in the process of raising the temperature of the polymer and drying it through infrared heating. Wherein, while the temperature is raised to about 180° C. and then maintained at 180° C., the total drying time is set to 20 minutes including temperature raising step of 5 minutes, and the moisture content is measured.

Next, the obtained hydrogel polymer is dried.

Before the drying step, if necessary, a step of coarsepulverizing may be further conducted so as to increase the efficiency of the drying step.

The construction of a pulverizer is not limited, but specifically, the pulverizer may include any one selected from the group consisting of a vertical pulverizer, a turbo cutter, a turbo grinder, a rotary cutter mill, a cutter mill, a disc mill, a shred crusher, a crusher, a chopper and a disc cutter, but is not limited thereto.

The pulverization step may be conducted such that the particle diameter of the hydrogel polymer may become about 2 to about 10 mm.

Pulverization to a particle diameter less than 2 mm is not technically easy due to high moisture content of the hydrogel polymer, and it may cause aggregation between pulverized particles. Meanwhile, if pulverization is conducted to a particle diameter greater than 10 mm, the effect for increasing the efficiency of the subsequent drying step may be insignificant.

The hydrogel pulverized as described above, or the hydrogel immediately after polymerization without pulverization is dried. Wherein, the drying temperature of the drying step may be about 150 to about 250° C. If the drying temperature is less than 150° C., drying time may become too long and the physical properties of the finally formed super absorbent polymer may be degraded, and if the drying temperature is greater than 250° C., only the surface of the polymer may be dried to generate fine particles in the subsequent pulverization process, and the physical properties of the finally formed super absorbent polymer may be degraded. Thus, the drying may be preferably conducted at a temperature of about 150 to about 200° C., more preferably at a temperature of about 160 to about 180° C.

Meanwhile, considering the process efficiency and the like, the drying time may be about 20 minutes to about 90 minutes, but is not limited thereto.

The drying method of the drying step is not specifically limited as long as it is commonly used as a drying process of hydrogel polymer. Specifically, the drying step may be progressed by hot wind, UV irradiation, microwave irradiation, or infrared irradiation and the like. The moisture content of the polymer after progressing the drying step may be about 0.1 to about 10 wt %.

Next, the dried polymer obtained by the drying step is pulverized.

The polymer powder obtained after the pulverization may have a particle diameter of about 150 to about 850 μm. As the pulverizer used for pulverization to such particle diameter, a pin mill, a hammer mill, a screw mill, a roll mill, a disc mill or a jog mill and the like may be used, but is not limited thereto.

And, in order to manage the physical properties of supper absorbent polymer powder finally made into products after the pulverization, a step of classifying the polymer powder obtained after the pulverization according to the particle diameter may be further conducted. Preferably, polymer having a particle diameter of about 150 to about 850 μm is classified, and only the polymer powder having such particle diameter is crosslinked to make it into a product.

Next, a surface crosslinker is added to the pulverized polymer and a surface crosslinking reaction is progressed.

The surface crosslinking is a step of increasing the crosslinking density near the surface of super absorbent polymer particles with regard to the crosslinking density inside of the particles. In general, the surface crosslinker is coated on the surface of super absorbent polymer particles. Thus, this reaction occurs on the surface of super absorbent polymer particles, which improves crosslinking capacity on the surface of the particles without substantially influencing on the inside of the particles. Thus, the surface-crosslinked super absorbent polymer particles have higher crosslinking density near the surface than inside of the particles.

Wherein, as the surface crosslinker, compounds that can react with the functional group of polymer may be used without specific limitation on the construction.

Preferably, to improve the properties of the produced super absorbent polymer, as the surface crosslinker, at least one selected from the group consisting of polyhydric alcohol compounds; epoxy compounds; polyamine compounds; polyamine compounds; haloepoxy compounds; condensation products of haloepoxy compounds; oxazoline compounds; mono-, di- or polyoxazolidinone compounds; cyclic urea compounds; multivalent metal salts; and alkylene carbonate compounds may be used.

Specifically, as the polyhydric alcohol compounds, at least one selected from the group consisting of mono-, di-, tri-, tetra- or polyethyleneglycol, monopropyleneglycol, 1,3-propanediol, dipropyleneglycol, 2,3,4-trimethyl-1,3-pentanediol, polypropyleneglycol, glycerol, polyglycerol, 2-butene-1,4-diol, 1,4-butanediol, 1,3-butanediol, 1,5-pentanediol, 1,6-hexanediol, and 1,2-cyclohexanedimethanol may be used.

As the epoxy compounds, at least one selected from the group consisting of ethyleneglycol diglycidyl ether and glycidol and the like may be used, and, as the polyamine compounds, at least one selected from the group consisting of ethylenediamine, diethylenetriamine, triethylenetetramine, tetraethylenepentamine, pentaethylenehexamine, polyethyleneimine and polyamidepolyamine may be used.

As the haloepoxy compounds, epichlorohydrin, epibromohydrin and α-methylepichlorohydrin may be used, and as the mono-, di- or polyoxazolidinone compounds, 2-oxazolidinone and the like may be used.

And, as the alkylene carbonate compounds, ethylene carbonate and the like may be used. They may be used alone or in combinations. Meanwhile, in order to increase the efficiency of the surface crosslinking process, it is preferable to include at least one polyhydric alcohol compounds in the surface crosslinker, and more preferably, a C2-10 polyhydric alcohol compound may be used.

The content of the surface crosslinker may be appropriately selected according to the kind of the surface crosslinker or reaction conditions, but commonly, based on 100 parts by weight of the polymer, about 0.001 to about 5 parts by weight, preferably about 0.01 to about 3 parts by weight, more preferably about 0.05 to about 2 parts by weight of the surface crosslinker may be used.

If the content of the surface crosslinker is too small, surface crosslinking may hardly occur, and if it is greater than 5 parts by weight based on 100 parts by weight of the polymer, absorption capacity and physical properties may be lowered due to the excessive surface crosslinking reaction.

The method of adding the surface crosslinker to the polymer is not specifically limited. The surface crosslinker and polymer powder may be put in a reactor and mixed, the surface crosslinker may be sprayed on polymer powder, or the surface crosslinker and polymer may be continuously supplied to a continuously operated mixer and mixed, and the like.

When the surface crosslinker is added, water may be additionally mixed together. In case water is added, the surface crosslinker may be evenly dispersed on the polymer. Wherein, the content of added water may be preferably about 1 to about 10 parts by weight based on 100 parts by weight of the polymer, so as to induce even dispersion of the surface crosslinker, prevent the agglomeration of polymer powder, and optimize the surface penetration depth of the crosslinker.

By heating polymer particles to which the surface crosslinker is added at a temperature of about 140 to about 220° C., preferably about 160 to about 200° C. for about 15 to about 90 minutes, preferably about 20 to about 80 minutes, a surface crosslinking reaction and drying may be simultaneously conducted. If the crosslinking temperature is less than 140° C., surface crosslinking may not occur, and if it is greater than 220° C., foreign substance and odor may be generated due to carbonization, and due to the excessive reaction, the physical properties may be degraded and stable process operation conditions cannot be secured. And, if the crosslinking reaction time is too short as less than 15 minutes, sufficient crosslinking may not be achieved, and if it is greater than 90 minutes, due to excessive surface crosslinking, polymer particles may be damaged and the physical properties may be degraded.

A temperature raising means for surface crosslinking is not specifically limited. Heating medium may be supplied or heat source may be directly supplied and heated. Wherein, the kind of heating medium that can be used may include steam, hot wind, temperature-raised fluid such as hot oil, and the like, but is not limited thereto, and the temperature of the supplied heating medium may be appropriately selected considering the means of heating medium, temperature-raising speed, and target temperature. Meanwhile, the directly supplied heat source may include electric heating, gas heating, but is not limited to the above examples.

Super absorbent polymer obtained according to the preparation method of the present invention may exhibit high centrifuge retention capacity (water holding capacity) and high absorption capacity under pressure, and low water soluble component content.

For example, the super absorbent polymer prepared according to the preparation method of the present invention exhibits centrifuge retention capacity of about 34 g/g to about 37 g/g as measured according to EDANA method WSP 241.2, and absorption capacity under pressure of about 24 g/g to about 27 g/g as measured according to EDANA method WSP 242.2, thus exhibiting excellent centrifuge retention capacity and absorption capacity under pressure. And, it exhibits low water soluble component content of about 11 to about 13 wt %.

Hereinafter, the present invention will be explained with the following examples. However, these examples are only to illustrate the invention, and the scope of the invention is not limited thereto.

EXAMPLE

Example 1

100 g of acrylic acid monomers, 38.9 g of caustic soda (NaOH) and 103.9 g of water were mixed, and to the mixture, 0.01 g of diphenyl(2,4,6-trimethylbenzoyl)-phosphine oxide as a photopolymerization initiator, 0.18 g of sodium persulfate as a thermal polymerization initiator and 0.30 g of polyethyleneglycol diacrylate as a crosslinker were added to prepare a monomer composition.

The temperature of the monomer composition was maintained at 40° C. using a thermostat, the composition was injected into a rotary belt in the form of a 2-axis silicon belt, and UV was irradiated thereto at the intensity of 10 mW for 60 seconds using mercury UV lamp light source. And, when thermal polymerization was conducted after photopolymerization, the internal temperature of the reactor was maintained at 90° C., and hot wind and insulation device was installed so that thermal polymerization can smoothly occur.

The obtained hydrogel type polymer was cut to an average particle diameter of 10 mm with a cutter, dried in a hot air dryer at 180° C. for 40 minutes, and then, repulverized using a rotary mixer, and classified into those having a particle size of 150 to 850 μm using an apparatus for measuring particle size distribution to prepare base polymer.

A surface treatment solution comprising 3.2 g of water, 4.0 g of methanol, 0.18 g of 1,3-propanediol was sprayed to 100 g of the base polymer and evenly dispersed on the surface of the particles, and then, reacted at 190° C. for 30 minutes to obtain surface-treated super absorbent polymer.

Example 2

Super absorbent polymer was prepared by the same method as Example 1, except that the initial temperature of the monomer composition was maintained at 50° C. using a thermostat.

Example 3

Super absorbent polymer was prepared by the same method as Example 1, except that the initial temperature of the monomer composition was maintained at 35° C. using a thermostat.

Example 4

Super absorbent polymer was prepared by the same method as Example 1, except that 0.005 g of diphenyl(2,4,6-trimethylbenzoyl)-phosphine oxide was used.

Example 5

Super absorbent polymer was prepared by the same method as Example 1, except that 0.01 g of lucirin TPO was used instead of diphenyl(2,4,6-trimethylbenzoyl)-phosphine oxide.

Example 6

Super absorbent polymer was prepared by the same method as Example 1, except that 0.07 g of sodium persulfate was used.

Comparative Example 1

Super absorbent polymer was prepared by the same method as Example 1, except that the initial temperature of the monomer composition was maintained at 80° C.

Comparative Example 2

Super absorbent polymer was prepared by the same method as Example 1, except that the initial temperature of the monomer composition was maintained at 25° C.

Comparative Example 3

Super absorbent polymer was prepared by the same method as Example 1, except that the internal temperature of the reactor was maintained at 50° C.

Experimental Examples

Measurement of Centrifuge Retention Capacity, Absorption Capacity Under Pressure and Water Soluble Component Content Centrifuge retention capacity was measured according to EDANA method WSP 241.2. 0.2 g of super absorbent polymer that was classified into 30-50 mesh was put in a teabag, soaked in a 0.9% brine solution for 30 minutes, and then, water was removed in a centrifuge set to 250 G for 3 minutes, and it was weighed to measure the amount of water held by super absorbent polymer, thereby measuring the water holding capacity.

Absorption capacity under pressure was measured according to EDANA method WSP 242.2. Specifically, 0.9 g of super absorbent polymer of 850 to 150 μm was evenly distributed in a cylinder prescribed in the EDANA method, and pressurized under pressure of 21 g/cm² with a piston and weights, and then, absorption capacity under pressure was calculated as the amount of absorbing a 0.9% brine solution for 1 hour.

Water soluble component content was measured according to EDANA method 270.2. Specifically, 1 g of super absorbent polymer was put in a 250 mL Erlenmeyer flask, and then, eluted in 200 mL of a 0.9% brine solution for 18 hours. The gel part of the eluted solution was filtered with a filter paper (No. 4), only the part dissolved in the 0.9% brine solution was taken and the content was analyzed, and thus, water soluble component content was measured by calculating the weight ratio of the eluted super absorbent polymer to the weight of super absorbent polymer before elution.

The physical property values of Examples and Comparative Examples measured according to the above method are shown in the following Table 1.

TABLE 1

|  | Centrifuge retention capacity (g/g) | Absorption capacity under pressure (g/g) | water soluble component content (wt %) |
|---|---|---|---|
| Example 1 | 35.1 | 25.2 | 12.5 |
| Example 2 | 34.5 | 24.9 | 11.9 |
| Example 3 | 35.7 | 24.9 | 12.7 |
| Example 4 | 34.2 | 24.7 | 12.9 |
| Example 5 | 34.7 | 25.1 | 12.4 |
| Example 6 | 35.6 | 24.0 | 12.0 |
| Comparative Example 1 | 33.2 | 24.0 | 13.8 |
| Comparative Example 2 | 36.1 | 23.4 | 15.2 |
| Comparative Example 3 | 33.8 | 23.8 | 17.7 |

What is claimed is:

1. A method for preparing super absorbent polymer comprising the steps of:
    performing photopolymerization of a monomer composition comprising water soluble ethylene unsaturated monomers, a thermal polymerization initiator and a photopolymerization initiator at a temperature of 30 to 55° C.;
    performing a thermal polymerization and a photopolymerization at a temperature of 55 to 120° C. to form a hydrogel polymer; and
    drying the hydrogel polymer,
    wherein the temperature of the monomer composition reaches 55° C. or more in the step of performing photopolymerization of the monomer composition, and the thermal polymerization is progressed at the temperature of 55° C. or more.

2. The method according to claim 1, wherein the thermal polymerization initiator includes at least one selected from the group consisting of persulfate initiators, azo initiators, hydrogen peroxide, and ascorbic acid.

3. The method according to claim 1, wherein the photopolymerization initiator includes at least one selected from the group consisting of benzoin ether, dialkyl acetophenone, hydroxyl alkylketone, phenyl glyoxylate, benzyl dimethyl ketal, acyl phosphine and α-aminoketone.

4. The method according to claim 1, wherein the hydrogel polymer has a moisture content of 40 to 80%, before drying the hydrogel polymer.

5. The method according to claim 1, further comprising the step of pulverizing the hydrogel polymer to a particle diameter of 2 to 10 mm, before drying the hydrogel polymer.

6. The method according to claim 1, wherein the drying of the hydrogel polymer is performed at a temperature of 150 to 250° C.

7. The method according to claim 1, further comprising the steps of
    pulverizing the dried polymer; and
    performing a surface crosslinking reaction of a pulverized polymer.

8. The method according to claim 7, wherein the pulverization of the dried polymer is progressed to a particle diameter of 150 to 850 μm.

9. The method according to claim 7, further comprising the step of classifying the pulverized polymer into a polymer having a particle diameter of 150 to 850 μm, before the surface crosslinking reaction.

10. The method according to claim 1, wherein the super absorbent polymer has a centrifuge retention capacity of 34 to 37 g/g, an absorption capacity under pressure of 24 to 27 g/g, and a water soluble component content of 11 to 13 wt %.

* * * * *